United States Patent
Koskinen et al.

(10) Patent No.: US 12,289,624 B2
(45) Date of Patent: Apr. 29, 2025

(54) RESTRICTIONS FOR RNA UPDATE PROCEDURE DURING SDT PROCEDURE

(71) Applicant: Nokia Technologies Oy, Espoo (FI)

(72) Inventors: Jussi-Pekka Koskinen, Oulu (FI); Samuli Heikki Turtinen, Oulu (FI); Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/918,315

(22) Filed: Oct. 17, 2024

(65) Prior Publication Data
US 2025/0039700 A1    Jan. 30, 2025

Related U.S. Application Data

(63) Continuation of application No. 18/710,057, filed as application No. PCT/CN2021/138946 on Dec. 16, 2021.

(51) Int. Cl.
| H04W 4/00 | (2018.01) |
| H04W 24/02 | (2009.01) |
| H04W 74/0836 | (2024.01) |
| H04W 76/20 | (2018.01) |
| H04W 76/30 | (2018.01) |

(52) U.S. Cl.
CPC ....... *H04W 24/02* (2013.01); *H04W 74/0836* (2024.01); *H04W 76/20* (2018.02); *H04W 76/30* (2018.02)

(58) Field of Classification Search
CPC . H04W 24/02; H04W 74/0836; H04W 76/20; H04W 76/30
See application file for complete search history.

(56) References Cited

U.S. PATENT DOCUMENTS

| 2021/0274391 A1* | 9/2021 | Khlass ................. H04W 76/19 |
| 2023/0099762 A1* | 3/2023 | Khoshkholgh Dashtaki ............... H04W 72/23 370/350 |

FOREIGN PATENT DOCUMENTS

| CN | 111800888 A | 10/2020 | |
| EP | 3923642 A1 | 12/2021 | |
| GB | 2625181 A * | 6/2024 | ............ H04W 76/12 |
| KR | 20230104173 A * | 7/2023 | ............ H04W 24/08 |
| WO | 2021/182812 A1 | 9/2021 | |
| WO | WO-2022191599 A1 * | 9/2022 | ............ H04W 76/25 |
| WO | WO-2022192567 A1 * | 9/2022 | ......... H04L 27/2601 |
| WO | WO-2023014582 A1 * | 2/2023 | ........ H04W 36/0079 |

(Continued)

OTHER PUBLICATIONS

"Work Item on NR smalldata transmissions in Inactive state", 3GPP TSG RAN Meeting #86, RP-193252, Agenda: 9.1.2, ZTE Corporation, Dec. 9-12, 2019, 4 pages.

(Continued)

*Primary Examiner* — Thai Dinh Hoang
(74) *Attorney, Agent, or Firm* — Nokia Technologies Oy

(57) ABSTRACT

Example embodiments of the present disclosure relate to devices, methods, apparatuses and computer readable storage media for restrictions for a radio access network based notification area (RNA) update procedure during a small data transmission (SDT) procedure. In example embodiments, the first device initiates the SDT procedure. Then, the first device restricts performing of the RNA update procedure during the SDT procedure.

8 Claims, 6 Drawing Sheets

(56) References Cited

FOREIGN PATENT DOCUMENTS

| WO | WO-2023205512 A1 * | 10/2023 | ............ H04W 76/19 |
| WO | WO-2024035926 A1 * | 2/2024 | ............ H04B 7/1851 |

OTHER PUBLICATIONS

"Msc-generator", Sourceforge, Retrieved on Mar. 18, 2024, Webpage available at :https://sourceforge.net/projects/msc-generator/.

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.

"3rd Generation Partnership Project; Technical Specification Group Radio Access Network; NR; Medium Access Control (MAC) protocol specification (Release 16)", 3GPP TS 38.321, V16.6.0, Sep. 2021, pp. 1-158.

International Search Report and Written Opinion received for corresponding Patent Cooperation Treaty Application No. PCT/CN2021/138946, dated Sep. 14, 2022, 9 pages.

"Handling legacy control plane operations during SDT procedure", 3GPP TSG-RAN2 Meeting #116 Electronic, R2-2109526, Agenda: 8.6.3, Samsung, Nov. 1-12, 2021, 3 pages.

"Control Plane leftover issues on SDT procedure", 3GPP TSG RAN WG2 Meeting #116e, R2-2109620, Agenda: 8.6.3, Intel Corporation, Nov. 1-12, 2021, 11 pages.

"Control Plane Common aspects for SDT", 3GPP TSG-RAN WG2 #116-e, R2-2110595, Agenda: 8.6.3, Huawei, Nov. 1-12, 2021, pp. 1-15.

"Consideration on CP issues", 3GPP TSG-RAN WG2 Meeting #115 electronic, R2-2108682, Agenda: 8.6.3, CATT, Aug. 9-27, 2021, 5 pages.

Office action received for corresponding Chinese Patent Application No. 202180104985.0, dated Feb. 21, 2025, 7 pages of office action and 4 pages of translation available.

* cited by examiner

RESTRICTIONS FOR RNA UPDATE PROCEDURE DURING SDT PROCEDURE

RELATED APPLICATIONS

This application is a 37 C.F.R. § 1.53 (b) continuation of co-pending U.S. patent application Ser. No. 18/710,057 filed May 14, 2024, which claims priority to PCT Application No. PCT/CN2021/138946, filed on Dec. 16, 2021, which is incorporated herein by reference in its entirety.

FIELD

Example embodiments of the present disclosure generally relate to the field of communications, and in particular, to devices, methods, apparatuses and computer readable storage media for restrictions for a radio access network (RAN) based notification area (RNA) update procedure during a small data transmission (SDT) procedure.

BACKGROUND

In New Radio (NR), to avoid signaling overhead and delay associated with mode transition of user equipment (UE) from a radio resource control INACTIVE (RRC_INACTIVE) mode to an RRC_CONNECTED mode, a transmission scheme called SDT has been proposed to facilitate data transmission. In the SDT, data interaction between a base station and a UE may be achieved, while the UE is in the RRC_INACTIVE mode during the transmission.

Under the circumstance where the UE is in the RRC_INACTIVE mode, a RNA update procedure is used to report location information of the UE to the base station serving the UE. The UE maintains a timer called T380 used to trigger the RNA update procedure. For example, as a response, the base station may transmit to the UE an RRC release message with a suspend indication to instruct the UE to maintain the RRC_INACTIVE mode. As such, the base station can schedule transmission in time in case potential uplink (UL) or downlink (DL) transmission occurs. In some network implementations, a UE initiated periodic RNA update procedure triggers the network to send the UE to RRC IDLE.

However, if the RNA update procedure is triggered during the SDT procedure, a collision between the SDT procedure and the RNA update procedure can happen. Thus, dealing with the potential collision is still an important issue to be solved. If the SDT procedure is successful, a periodic RNA update procedure may not be required, because the network may have just communicated with the UE during the SDT procedure and the network may configure a periodic RNA update for the UE using RRC Release message. A RNA update procedure triggered by the expiry of T380 timer is known as periodic RNA update.

SUMMARY

In general, example embodiments of the present disclosure provide devices, methods, apparatuses and computer readable storage media for restrictions for a RNA update procedure during a SDT procedure.

In a first aspect, a first device is provided which comprises at least one processor and at least one memory including computer program code. The at least one memory and the computer program code are configured to, with the at least one processor, cause the first device to initiate a small data transmission, SDT, procedure. The first device is further caused to restrict performing of a radio access network based notification area, RNA, update procedure during the SDT procedure.

In a second aspect, a second device is provided which comprises at least one processor and at least one memory including computer program code. The at least one memory and the computer program code are configured to, with the at least one processor, cause the second device to, upon completion of a small data transmission, SDT, procedure, determine re-starting or starting of a timer to be used by a first device to trigger a periodic radio access network based notification area, RNA, update procedure. The second device is further caused to transmit, to the first device, an instruction to re-start or start the timer.

In a third aspect, a method is provided. In the method, a small data transmission, SDT, procedure is initiated. Moreover, performing of a radio access network based notification area, RNA, update procedure is restricted during the SDT procedure.

In a fourth aspect, a method is provided. In the method, upon completion of a small data transmission, SDT, procedure, re-starting or starting of a timer to be used by a first device to trigger a periodic radio access network based notification area, RNA, update procedure is determined. Moreover, an instruction to re-start or start the timer is transmitted to the first device.

In a fifth aspect, there is provided an apparatus comprising means for performing the method according to the third or fourth aspect.

In a sixth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
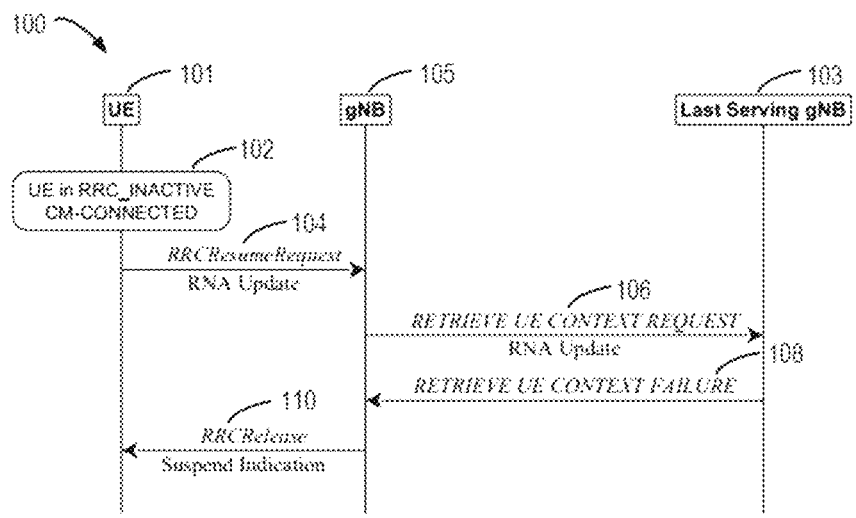
FIG. 1 illustrates a periodic RNA update procedure without UE context relocation.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the user device include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

In the third generation partnership project (3GPP) Release 17 (Rel-17), there are some discussions about NR SDT in the INACTIVE mode. As stated above, to avoid the signaling overhead and delay associated with mode transition of a UE from the RRC_INACTIVE mode to the RRC_CONNECTED mode, the SDT procedure is used. Both random access channel based (RACH-based) SDT and configured grant based (CG-based) SDT procedures are discussed.

UL SDT for RACH-based schemes, such as, 2-step and 4-step RACH-based SDT, are discussed. Message A (MSG A) or Message 3 (MSG 3) are used to enable UP data transmission for small data packets in the case where the UE is in the INACTIVE mode. Further, it is discussed to enable flexible payload sizes larger than the size of a common control channel (CCCH) message that is possible currently for the INACTIVE mode for the MSG A and MSG 3 to support UP data transmission in UL as discussed in Release 16 (Rel-16). The actual payload size can be up to network configuration. There are some further discussions about context fetch and data forwarding in INACTIVE mode for RACH-based SDT procedures.

There are also some discussions about SDT in the INACTIVE mode in UL on pre-configured physical uplink share channel (PUSCH) resources, when TA is valid. In this case, the configured grant type 1 is reused. A general procedure for SDT using the configured grant type 1 resources and configuration of the configured grant type1 resources are also concerned.

As discussed above, under the circumstance where a UE is in the RRC_INACTIVE mode, a RNA update procedure is used to report location information of the UE to the base station serving the UE. The UE maintains the T380 for triggering the RNA update procedure. Periodic RNA update procedure may be triggered in case the T380 expires. In response, the base station may transmit to the UE an RRC release message with a suspend indication to instruct the UE to maintain the RRC_INACTIVE mode. As such, the base station can schedule transmission in time in case potential uplink (UL) or downlink (DL) transmission occurs. In some other cases, if the UE has initiated data transmission, the base station may transmit to the UE an RRC Resume message to instruct the UE to change to the RRC_CON-NECTED mode. Accordingly, the T380 is stopped upon reception of the RRC Release message, for the reason that the periodic RNA update procedure is not triggered in the CONNECTED mode.

FIG. 1 shows a periodic RNA update procedure without UE context relocation.

As shown in the FIG. 1, a UE 101 is configured to perform a RNA update procedure, and a last serving gNB 103 decides not to relocate the UE context and to keep the UE in the RRC_INACTIVE mode. At 102, the UE is in the RRC_INACTIVE mode. The connection management (CM) is enabled. At 104, the UE 101 transmits an RRCResumeRequest message with a cause set to RNA update to the current serving gNB 105. At 106 and 108, the current serving gNB 105 try to retrieve the UE context from the last serving gNB 103, but fails for the reason that the last serving gNB 103 decides not to relocate the UE context. Then, at 110, the current serving gNB 105 transmits an RRCRelease message with a suspend indication to the UE 101, to instruct the UE 101 to maintain the RRC_INACTIVE mode.

However, if the RNA update procedure is triggered during the SDT procedure, the SDT procedure will be disturbed. Besides, by now, there is no effective way to deal with the potential collision.

Example embodiments of the present disclosure provide a scheme of restrictions for the RNA update procedure during the SDT procedure. With the scheme, a device (referred to as a first device), such as a UE, initiates a SDT procedure. Further, the first device restricts performing of a RNA update procedure during the SDT procedure. For example, the first device may stop a timer used to trigger the RNA procedure. As another example, the first device may avoid or postpone the performing of the RNA update procedure. Alternatively, the first device may perform the RNA update procedure during the SDT procedure using further resources configured for the SDT procedure.

This scheme avoids a collision between the SDT procedure and the RNA update procedure flexibly and efficiently. As such, it is allowed to avoid unnecessary signaling overhead and power consumption.

Figure 2:
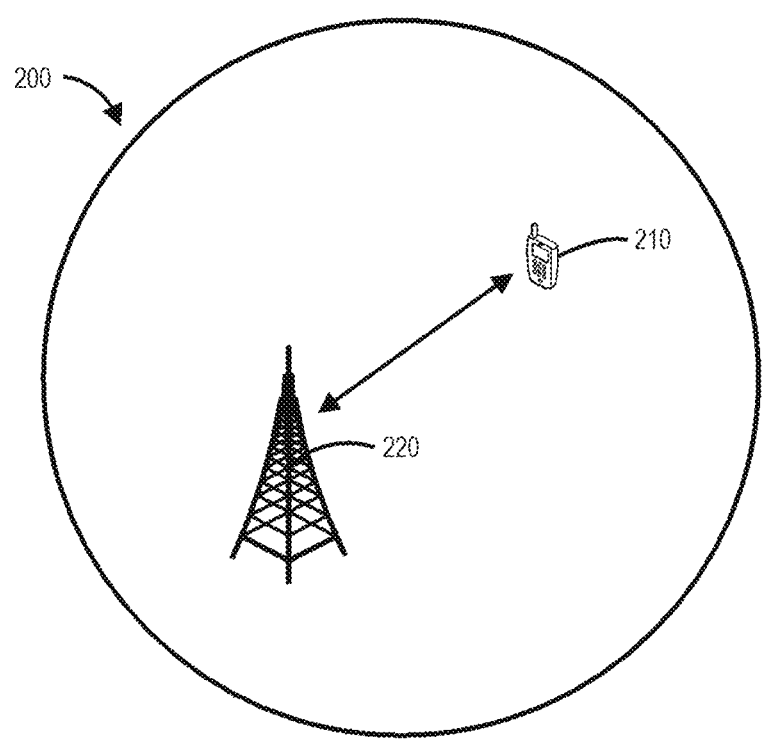
FIG. 2 illustrates an example environment in which example embodiments of the present disclosure can be implemented.

FIG. 2 shows an example environment 200 in which example embodiments of the present disclosure can be implemented.

The environment 200, which may be a part of a communication network, comprises two devices 210 and 220 communicating with each other or with other devices via each other. For the purpose of discussion, the devices 210 and 220 may be referred to as a first device 210 and a second device 220, respectively.

The first and second devices 210 and 220 may be implemented by any suitable devices in the communication network. In some example embodiments, the first device 210 may be implemented by a terminal device and the second device 220 may be implemented by a network device, or vice versa. In some other example embodiments, the first and second devices 210 and 220 may be both implemented by terminal devices or network devices. Just for the purpose of discussion, in this example, the terminal device will be taken as an example of the first device 210, and the network device will be taken as an example of the second device 220.

It is to be understood that two devices are shown in the environment 200 only for the purpose of illustration, without suggesting any limitation to the scope of the present disclosure. In some example embodiments, the environment 200 may comprise a further device to communicate synchronization assistance information with the first device 210 and the second device 220.

The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

According to some example embodiments of the present disclosure, the first device 210 initiates a SDT procedure. Further, the first device 210 restricts performing of a RNA update procedure during the SDT procedure. For example, the terminal device may stop a timer used to trigger the RNA procedure. As another example, the first device 210 may avoid or postpone the performing of the RNA update procedure. Alternatively, the first device 210 may perform the RNA update procedure during the SDT procedure using further resources configured for the RNA update procedure. As such, a collision between the SDT procedure and the RNA update procedure will be avoided efficiently, and signaling overhead and power consumption reduced.

According to some other example embodiments of the present disclosure, the second device 220, upon completion of the SDT procedure, determines re-starting or starting of the timer to be used by the first device 210 to trigger a periodic RNA update procedure. Moreover, the second device 220 transmits an instruction to re-start or start the timer to the first device 210. As such, a periodic RNA update procedure may be configured by the second device 220.

Figure 3:
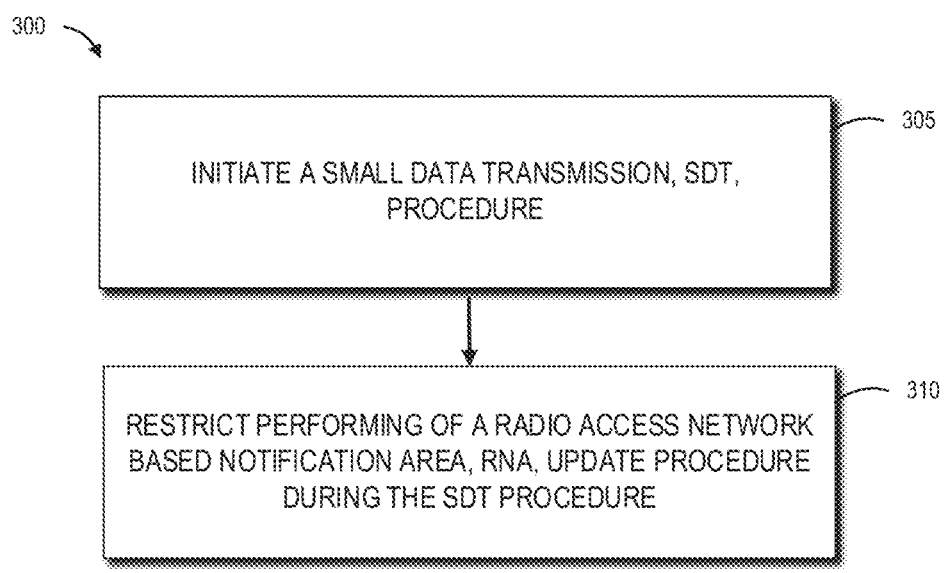
FIG. 3 illustrates a flowchart of an example method according to some example embodiments of the present disclosure.

FIG. 3 shows a flowchart of an example method 300 according to some example embodiments of the present disclosure. The method 300 can be implemented by the first device 210 as shown in FIG. 2. For the purpose of discussion, the method 300 will be described with reference to FIG. 2.

As shown in FIG. 3, at block 305, the first device 210 initiates a SDT procedure. For example, if the first device 210 has small data packets to be transmitted, it may initiate a SDT procedure in the RRC_INACTIVE mode to reduce signaling overhead and delay.

As stated above, in the RRC_INACTIVE mode, periodic RAN update procedure is used to report location information of the first device 210 to the network 220. The first device 210 may maintain a timer used to trigger the RAN update procedure. Then, the first device 210 may transmit an RRC Resume request indicating RNA Update to the network 220, if the timer expires.

As shown in FIG. 3, at block 310, the first device 210 restricts performing of a RNA update procedure during the SDT procedure.

In some example embodiments, the first device 210 may stop a timer used to trigger the RNA update procedure to avoid the potential collision between the SDT procedure and the RNA update procedure. For example, the first device 210 may stop the timer if the SDT procedure is initiated. In this case, the timer may be stopped when the RRC Resume message is delivered for message 1 (MSG 1)/MSG 3/MSG A/CG transmission. Alternatively, the first device 210 may stop the timer if the SDT procedure is initiated and a random access procedure is completed. For example, the first device 210 may stop the timer upon reception of a random access message 4 (MSG 4) or a random access message B (MSG B) from the network 220. For example, the first device 210 may stop the timer if the contention resolution is successful. As an example, a MAC layer may indicate to an RRC layer the successful contention resolution, the completion of a random access procedure, or to stop the timer.

In some example embodiments, the first device 210 may avoid the performing of the RNA update procedure during the SDT procedure, upon expiration of the timer used to trigger the RNA update procedure during the SDT procedure. In this case, the performing of the RNA update procedure may be ignored to avoid the collision, even if the timer has expired.

In some example embodiments, the first device 210 may postpone the performing of the RNA update procedure, upon expiration of the timer used to trigger the RNA update procedure during the SDT procedure. For example, the first device 210 may postpone the performing of the RNA update procedure until a failure of a random access procedure during the SDT procedure. As an example, in case the first device 210 receives an RRC Reject message from the network 220 during the SDT procedure after the timer has expired, it may perform RNA update procedure. Alternatively, the first device 210 may postpone the performing of the RNA update procedure until an end of the SDT procedure. In this case, the first device 210 may keep the trigger of performing of the RNA update procedure if the timer expires during the SDT procedure, and perform the RNA update procedure after the SDT procedure is finished.

In some example embodiments, the first device 210 may determine whether a DCCH is configured for the SDT procedure, upon expiration of the timer used to trigger the RNA update procedure during the SDT procedure. Then, the first device 210 may perform the RNA update procedure using the DCCH during the SDT procedure, if it determines that the dedicated control channel is configured. For example, if a signaling radio bearer (SRB) 1 or SRB 2 is configured as allowed for the SDT procedure, the first device 210 may perform the RNA update procedure using the SRB 1 or SRB 2.

In some example embodiments, the first device 210 may stop the SDT procedure, if the timer used to trigger the RNA update procedure expires during the SDT procedure. In this case, the first device 210 may perform the RNA update procedure upon expiration of the timer.

Figure 4:
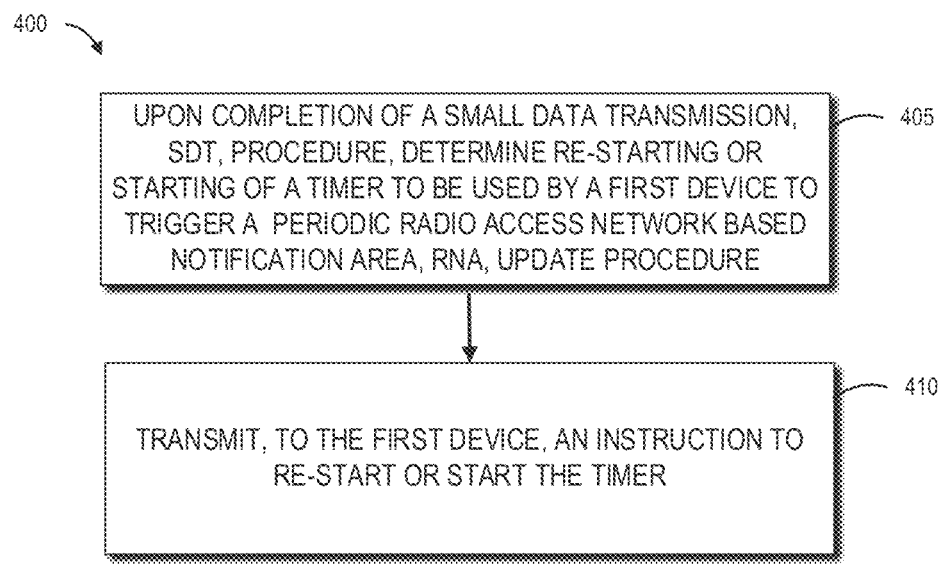
FIG. 4 illustrates a flowchart of an example method according to some other example embodiments of the present disclosure.

FIG. 4 shows a flowchart of an example method 400 according to some other example embodiments of the present disclosure. The method 400 can be implemented by the second device 220 as shown in FIG. 2. For the purpose of discussion, the method 400 will be described with reference to FIG. 2.

As shown in FIG. 4, at block 405, the second device 220 determines, upon completion of the SDT procedure, re-starting or starting of a timer to be used by the first device 210 to trigger a periodic RNA update procedure. In this case, the second device 220 considers that a periodic RNA update procedure is needed only when the timer expires after the SDT procedure. In other words, successful SDT procedure equals periodic RNA update.

Then, at block 410, the second device 220 transmits an instruction to re-start or start the timer to the first device 210. For example, the second device 220 may transmit the instruction to re-start or start the timer to the first device 210 in the RRC Release message.

Figure 5:
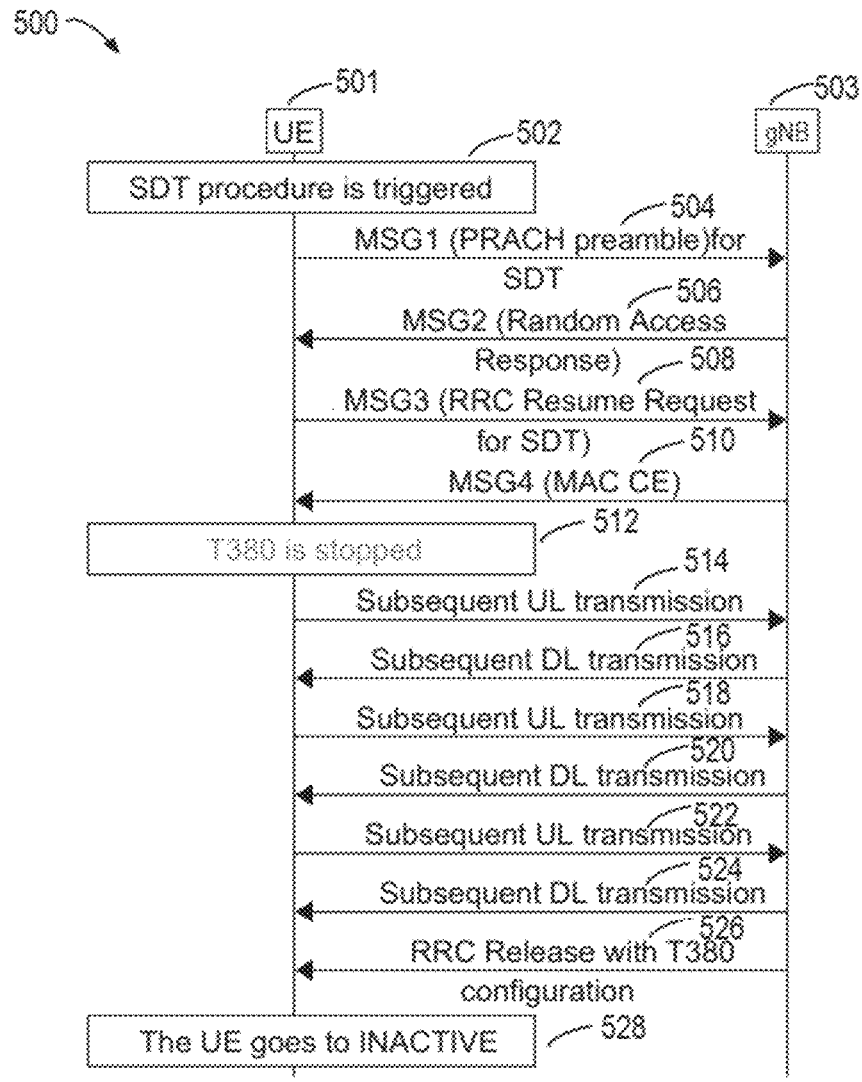
FIG. 5 illustrates a flowchart of an example process for restricting the RNA update procedure during a SDT procedure with 4-step RACH according to some example embodiments of the present disclosure.

FIG. 5 illustrates a flowchart of an example process 500 for restricting the RNA update procedure during a SDT procedure with 4-step RACH according to some example embodiments of the present disclosure. The example process 500 can be implemented by the first device 210 as shown in FIG. 2. For the purpose of discussion, the process 500 will be described with reference to FIG. 2. In this example process 500, the first device 210 is implemented by a UE 501 and the second device 220 is implemented by a gNB 503.

As shown in FIG. 5, at 502, the SDT procedure is triggered. At 504, the UE 501 transmits MSG 1 with physical random access channel (PRACH) preamble for the SDT procedure to the gNB 503. Accordingly, at 506, the gNB 503 transmits MSG 2 with Random Access Response to the UE 501. At 508, the UE 501 transmits MSG 3 with RRC Resume Request for the SDT procedure to the gNB 503. Accordingly, at 510, the gNB 503 transmits MSG 4 to the UE 501.

At 512, the UE 501 stops the T380 used to trigger the RNA procedure. As such, a potential collision between the RNA procedure and the ongoing SDT procedure will be avoided. Then, at 514-524, UL and DL data transmission between the UE 501 and the gNB 503 are performed. At 526, the gNB 503 transmits RRC release with configuration of the T380 to the UE 501, for example, a timer value for a periodic RNA update procedure. Accordingly, at 528, the UE 501 goes to the INACTIVE mode and maintains the T380 based on the configuration received from the gNB 503.

All operations and features as described above with reference to FIGS. 2-4 are likewise applicable to the method 500 and have similar effects. For the purpose of simplification, the details will be omitted.

Figure 6:
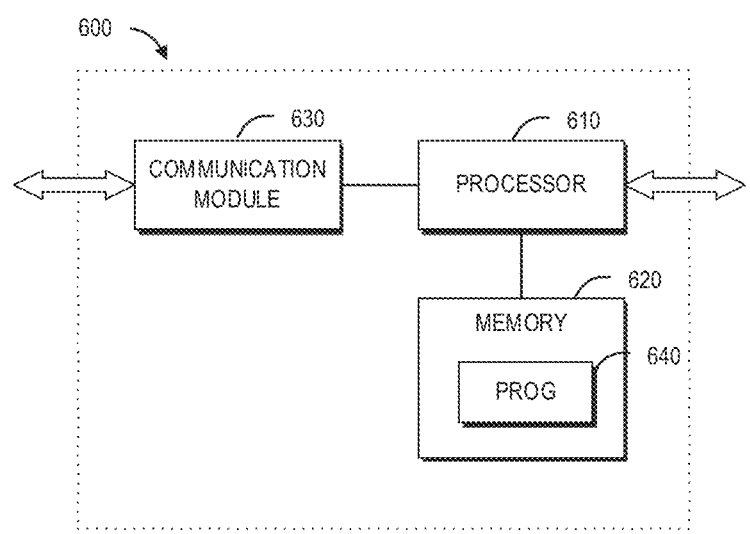
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 can be implemented at or as a part of the first device 210 or the second device 220 as shown in FIG. 2.

As shown, the device 600 includes a processor 610, a memory 620 coupled to the processor 610, a communication module 630 coupled to the processor 610, and a communication interface (not shown) coupled to the communication module 630. The memory 620 stores at least a program 640. The communication module 630 is for bidirectional communications, for example, via multiple antennas. The communication interface may represent any interface that is necessary for communication.

The program 640 is assumed to include program instructions that, when executed by the associated processor 610, enable the device 600 to operate in accordance with the example embodiments of the present disclosure, as discussed herein with reference to FIGS. 2-5. The example embodiments herein may be implemented by computer software executable by the processor 610 of the device 600, or by hardware, or by a combination of software and hardware. The processor 610 may be configured to implement various example embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

When the device 600 acts as the first device 210 or a part of the first device 210, the processor 610 and the communication module 630 may cooperate to implement the method 300 as described above with reference to FIG. 2. When the device 600 acts as the second device 220 or a part of the second device 220, the processor 610 and the communication module 630 may cooperate to implement the method 400 as described above with reference to FIG. 2. All operations and features as described above with reference to FIGS. 2-5 are likewise applicable to the device 600 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 400 as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a method comprises: at a first device, initiating a small data transmission, SDT, procedure; and restricting performing of a radio access network based notification area, RNA, update procedure during the SDT procedure.

In some example embodiments, restricting the performing of the RNA update procedure during the SDT procedure comprises: in response to the initiation of the SDT procedure, stopping a timer used to trigger the RNA update procedure.

In some example embodiments, restricting the performing of the RNA update procedure during the SDT procedure comprises: stopping a timer used to trigger the RNA update procedure upon reception of a random access message 4 or a random access message B from a second device.

In some example embodiments, restricting the performing of the RNA update procedure during the SDT procedure comprises: stopping a timer used to trigger the RNA update procedure upon a success of contention resolution.

In some example embodiments, restricting the performing of the RNA update procedure during the SDT procedure comprises: in response to the initiation of the SDT procedure and completion of a random access procedure, stopping a timer used to trigger the RNA update procedure.

In some example embodiments, restricting the performing of the RNA update procedure during the SDT procedure comprises: upon expiration of a timer used to trigger the RNA update procedure during the SDT procedure, avoiding the performing of the RNA update procedure during the SDT procedure.

In some example embodiments, restricting the performing of the RNA update procedure during the SDT procedure comprises: upon expiration of a timer used to trigger the RNA update procedure during the SDT procedure, postponing the performing of the RNA update procedure.

In some example embodiments, postponing the performing of the RNA update procedure comprises: postponing the performing of the RNA update procedure until a failure of a random access procedure during the SDT procedure.

In some example embodiments, postponing the performing of the RNA update procedure comprises: postponing the performing of the RNA update procedure until an end of the SDT procedure.

In some example embodiments, restricting the performing of the RNA update procedure during the SDT procedure comprises: upon expiration of a timer used to trigger the RNA update procedure during the SDT procedure, determining whether a dedicated control channel is configured for the SDT procedure; and in accordance with a determination that the dedicated control channel is configured, performing the RNA update procedure using the dedicated control channel during the SDT procedure.

In some aspects, a method comprises: at a second device, upon completion of a small data transmission, SDT, procedure, determining re-starting or starting of a timer to be used by a first device to trigger a periodic radio access network based notification area, RNA, update procedure; and transmitting, to the first device, an instruction to re-start or start the timer.

In some aspects, a first device comprises: at least one processor; and at least one memory including computer program code; the at least one memory and the computer program code configured to, with the at least one processor, cause the first device to: initiate a small data transmission, SDT, procedure; and restrict performing of a radio access network based notification area, RNA, update procedure during the SDT procedure.

In some example embodiments, the first device is caused to restrict the performing of the RNA update procedure during the SDT procedure by: in response to the initiation of the SDT procedure, stopping a timer used to trigger the RNA update procedure.

In some example embodiments, the first device is caused to restrict the performing of the RNA update procedure during the SDT procedure by: stopping a timer used to trigger the RNA update procedure upon reception of a random access message 4 or a random access message B from a second device.

In some example embodiments, the first device is caused to restrict the performing of the RNA update procedure during the SDT procedure by: stopping a timer used to trigger the RNA update procedure upon a success of contention resolution.

In some example embodiments, the first device is caused to restrict the performing of the RNA update procedure during the SDT procedure by: in response to the initiation of the SDT procedure and completion of a random access procedure, stopping a timer used to trigger the RNA update procedure.

In some example embodiments, the first device is caused to restrict the performing of the RNA update procedure during the SDT procedure by: upon expiration of a timer used to trigger the RNA update procedure during the SDT procedure, avoiding the performing of the RNA update procedure during the SDT procedure.

In some example embodiments, the first device is caused to restrict the performing of the RNA update procedure during the SDT procedure by: upon expiration of a timer used to trigger the RNA update procedure during the SDT procedure, postponing the performing of the RNA update procedure.

In some example embodiments, the first device is caused to postpone the performing of the RNA update procedure by: postponing the performing of the RNA update procedure until a failure of a random access procedure during the SDT procedure.

In some example embodiments, the first device is caused to postpone the performing of the RNA update procedure by: postponing the performing of the RNA update procedure until an end of the SDT procedure.

In some example embodiments, the first device is caused to restrict the performing of the RNA update procedure during the SDT procedure by: upon expiration of a timer used to trigger the RNA update procedure during the SDT procedure, determining whether a dedicated control channel is configured for the SDT procedure; and in accordance with a determination that the dedicated control channel is configured, performing the RNA update procedure using the dedicated control channel during the SDT procedure.

In some aspects, a second device comprises: at least one processor; and at least one memory including computer program code; the at least one memory and the computer program code configured to, with the at least one processor, cause the second device to: upon completion of a small data transmission, SDT, procedure, determine re-starting or starting of a timer to be used by a first device to trigger a periodic radio access network based notification area, RNA, update procedure; and transmit, to the first device, an instruction to re-start or start the timer.

In some aspects, an apparatus comprises: means for initiating a small data transmission, SDT, procedure; and means for restricting performing of a radio access network based notification area, RNA, update procedure during the SDT procedure.

In some example embodiments, the means for restricting the performing of the RNA update procedure during the SDT procedure comprises: means for in response to the initiation of the SDT procedure, stopping a timer used to trigger the RNA update procedure.

In some example embodiments, the means for restricting the performing of the RNA update procedure during the SDT procedure comprises: means for in response to the initiation of the SDT procedure and completion of a random access procedure, stopping a timer used to trigger the RNA update procedure.

In some example embodiments, the means for restricting the performing of the RNA update procedure during the SDT procedure comprises: means for upon expiration of a timer used to trigger the RNA update procedure during the SDT procedure, avoiding the performing of the RNA update procedure during the SDT procedure.

In some example embodiments, the means for restricting the performing of the RNA update procedure during the SDT procedure comprises: means for upon expiration of a timer used to trigger the RNA update procedure during the SDT procedure, postponing the performing of the RNA update procedure.

In some example embodiments, the means for postponing the performing of the RNA update procedure comprises: means for postponing the performing of the RNA update procedure until a failure of a random access procedure during the SDT procedure.

In some example embodiments, the means for postponing the performing of the RNA update procedure comprises: means for postponing the performing of the RNA update procedure until an end of the SDT procedure.

In some example embodiments, the means for restricting the performing of the RNA update procedure during the SDT procedure comprises: means for, upon expiration of a timer used to trigger the RNA update procedure during the SDT procedure, determining whether a dedicated control channel is configured for the SDT procedure; and means for, in accordance with a determination that the dedicated control channel is configured, performing the RNA update procedure using the dedicated control channel during the SDT procedure.

In some aspects, an apparatus comprises: means for, upon completion of a small data transmission, SDT, procedure, determining re-starting or starting of a timer to be used by a first device to trigger a periodic radio access network based notification area, RNA, update procedure; and means for transmitting, to the first device, an instruction to re-start or start the timer.

In some aspects, a computer readable storage medium comprises program instructions stored thereon, the instructions, when executed by a processor of a device, causing the device to perform the method according to some example embodiments of the present disclosure.

We claim:

1. A first device, comprising:
   at least one processor; and
   at least one memory including computer program code;
   the at least one memory and the computer program code configured to, with the at least one processor, cause the first device to:
   initiate a small data transmission, SDT, procedure; and
   upon expiration of a timer used to trigger a radio access network based notification area, RNA, update procedure during the SDT procedure, postpone performing the RNA update procedure.

2. The first device of claim 1, wherein the first device is caused to postpone the performing of the RNA update procedure by:
   postponing the performing of the RNA update procedure until a failure of a random access procedure during the SDT procedure.

3. The first device of claim 1, wherein the first device is caused to postpone the performing of the RNA update procedure by:
   postponing the performing of the RNA update procedure until an end of the SDT procedure.

4. A first device, comprising:
   at least one processor; and
   at least one memory including computer program code;
   the at least one memory and the computer program code configured to, with the at least one processor, cause the first device to:
   initiate a small data transmission, SDT, procedure; and
   upon expiration of a timer used to trigger a radio access network based notification area, RNA, update procedure during the SDT procedure, avoid performing the RNA update procedure during the SDT procedure.

5. A method comprising:
   at a first device,
   initiating a small data transmission, SDT, procedure; and
   upon expiration of a timer used to trigger a radio access network based notification area, RNA, update procedure during the SDT procedure, postponing performing the RNA update procedure.

6. The method of claim 5, wherein postponing the performing of the RNA update procedure comprises:
   postponing the performing of the RNA update procedure until a failure of a random access procedure during the SDT procedure.

7. The method of claim 5, wherein postponing the performing of the RNA update procedure comprises:
   postponing the performing of the RNA update procedure until an end of the SDT procedure.

8. A method comprising:
   at a first device,
   initiating a small data transmission, SDT, procedure; and
   upon expiration of a timer used to trigger a radio access network based notification area, RNA, update procedure during the SDT procedure, avoiding performing the RNA update procedure during the SDT procedure.

* * * * *